No. 890,368. PATENTED JUNE 9, 1908.
S. MONTGOMERY.
COMBINED GATE HINGE AND LATCH.
APPLICATION FILED DEC. 7, 1906.
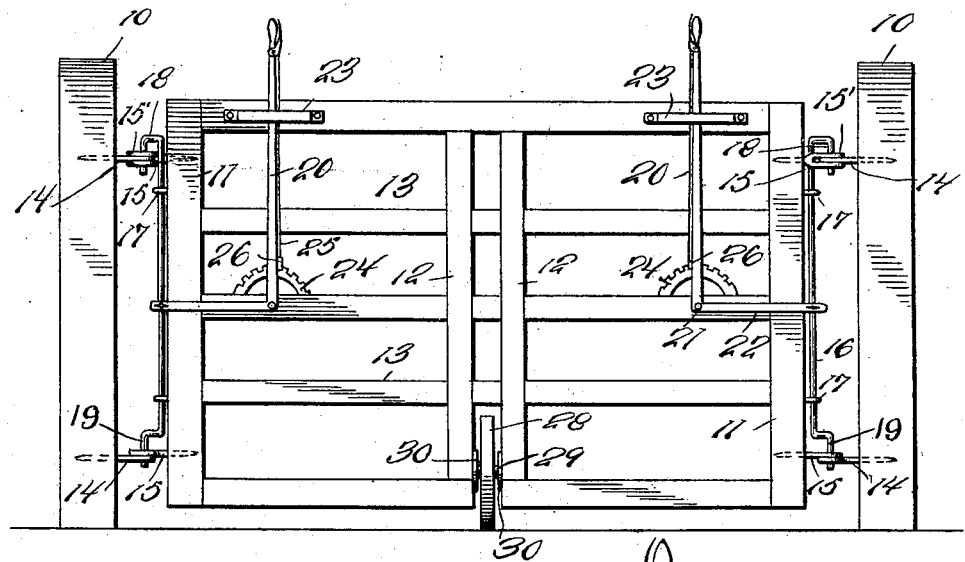
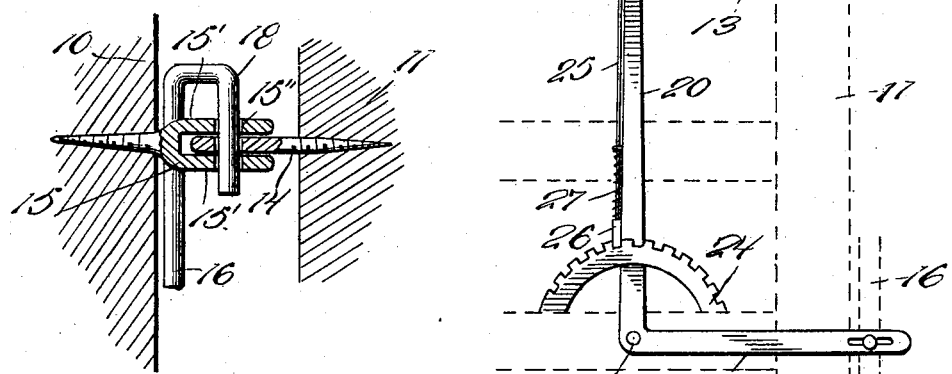

UNITED STATES PATENT OFFICE.

SAMUEL MONTGOMERY, OF LOOGOOTEE, INDIANA.

COMBINED GATE HINGE AND LATCH.

No. 890,368.     Specification of Letters Patent.     Patented June 9, 1908.

Application filed December 7, 1906. Serial No. 346,700.

*To all whom it may concern:*

Be it known that I, SAMUEL MONTGOMERY, a citizen of United States, residing at Loogootee, in the county of Martin, State of Indiana, have invented certain new and useful Improvements in a Combined Gate Hinge and Latch; and I do hereby declare the following to be a full, clear, and exact description of the invention, such as will enable others skilled in the art to which it appertains to make and use the same.

This invention has relation to that class of gates that are hinged so as to enable them to be opened in either direction at each end, and in which the pintles of the hinge serve also as a means for latching the gate.

It is the object of the invention to provide improvements, simple in construction, which will prevent the gate from being lifted from its hinges, and at the same time enhance the efficiency of the hinging means; and, moreover, it is the purpose of the improvements to provide means for latching the lever which operates the pintles of the hinges when they are used as latches, in any desired position, so as to hold the pintles raised out of connection with the other hinging means.

The nature of the improvements is shown in the annexed drawings, forming a part of this specification, in view of which drawings the improvements will first be described with respect to their construction and mode of operation and then be pointed out in the subjoined claims.

Of the said drawings—Figure 1 is a side view of a gate equipped with my improvements. Fig. 2 is a vertical sectional view of the dual eye piece and its connections, forming one of the hinges at each end of the gate. Fig. 3 is an inside view of the latch, operating lever and means for holding it in any desired position to which it may be moved.

Similar numerals of reference designate similar parts or features, as the case may be, wherever they occur.

In the drawings, 10 designates the gate-posts, 11 are the vertical end bars; 12, the vertical central bars; and, 13, the horizontal bars of the gate. These parts may be of the form and arrangement shown, or any other suited to the purpose.

14 designates eye-bolts secured to each of the posts 10 in any suitable way, the eyes of said bolts extending out in position so that when the gate is "swung to" at either end they will come into alinement with the eyes of the eye-bolts, 15, secured in the end upright 11 and extending out therefrom.

The uppermost eye-bolt 15 at each end of the gate is made double—that is with branching arms 15' each provided with an eye 15", one above the other and with an interspace sufficiently wide to admit the eye of the eye-bolt 14 between them with all three eyes in alinement.

The gate carries at each end a rod 16 guided vertically in suitable staples 17, connected with the upright bars 11, the end of each rod being bent to form vertical pintles 18 and 19, adapted for engagement with the eye bolts, the pintles of each rod being disposed in alinement with each other for this purpose.

20 is an angular lever fulcrumed at 21 on one of the horizontal bars of the gate and having the outer end of its angular and horizontal arm, 22, loosely connected to the rod 16, so that when the upper end of the vertical arm is moved inward, it will raise the said rod 16 and consequently its pintles 18 and 19 and free the end of the gate that has its said rod connected therewith so that said end of the gate may be opened outward or inward, swinging at the other end on the hinges formed by the eye-bolts and pintles of like form and arrangement to that forming the latching and unlatching means just explained. When the gate is swung to, the eyes of the eye-bolts connected with the gate post and upright of the gate will be brought into alinement, as has been described, and by a movement of the upper end of the lever 20 outward the pintles 18 and 19 will enter the eyes of the eye-bolts and latch or connect the gate with the posts, as before explained.

In order to lock the lever, in any position to which it may be moved within the limits allowed by the guide strap 23 extending over said lever and secured at its ends to the top bar of the gate, I provide a segmental plate, 24, notched in its outer margin and secure said plate to one of the horizontal bars of the gate at a point inside of the said lever. A small lever, 25, carrying a dog, 26, at its lower end adapted to engage the notches in the margin of the segment, is fulcrumed on the lever 20 just below the upper end which forms a handle, and the handle of the dog-carrying lever 25 extends at an angle to the handle of the lever 20. On taking hold of the latter handle the other handle may be grasped also and the lever 25 will be operated to disengage the dog 26 from the notched segment, when the lever 20 will be moved to raise the rod 16 and the pintles 18 and 19 and unlatch and open the gate. Upon the release of the handle of the lever 25, a spring, 27, will move it to engage one of the notches in the segment and so hold the rod 16 and its pintles raised, until the dog-carrying lever 20 is again operated to release lever 20, when the latter may be moved back to engage the pintles 18 and 19 with the eyes of the eye-bolts again.

By providing dual eye-bolts at the top of the gate, which extend on opposite sides of the eye in the eye-bolt connected with the gate, a construction is provided that prevents the gate from being lifted off its hinges. It is obvious that the dual eye-bolt may be arranged at the bottom of the gate and the single eye-bolt at the top; and that the eye-bolts may be screwed into the gate-bars and posts, if the material is such as to allow this to be done, or they may have their shanks flattened and provided with holes for the reception of screws or nails; or, again, in case the gate is made of iron, the eye-bolts may be welded to the upright bars.

The ground-wheel 28 for carrying the weight of the gate may have the ends of its axle 29 supported in bearings in the nature of flanged clips 30 secured to the central vertical bars, 12, so that the gate will be kept from sagging at either end and the eye-bolts will thus be kept in proper relative position.

What is claimed is—

The combination, with a pair of gate posts and a gate movable therebetween, the gate including end posts and horizontal bars connecting the same, of combined hinge and latch connections between the corresponding end posts and gate posts comprising an upper and a lower eye bolt secured to each end post and to the adjacent gate post and adapted to be brought into alinement with each other, the upper eye bolt of each end post having dual eyes disposed one above the other in spaced relation, to receive the upper eye bolt of the adjacent gate post therebetween, to prevent the gate when closed from being lifted off its hinges, a vertically movable rod carried by each end post and having its ends bent to form pintles adapted to engage the eyes of said eye bolts, an angle lever pivoted to each end of one of the horizontal bars of the gate and including a vertical arm and a horizontal arm, the last-mentioned arm of each lever being pivotally connected to the adjacent rod intermediate the ends thereof, a rack secured to each end of the above mentioned horizontal bar, a dog-carrying lever secured to the vertical arm of each angle lever and adapted for engagement with the adjacent rack, and a guide strap secured to each end of one of the horizontal bars of the gate and engaged with the vertical arm of the adjacent angle lever, to limit the movement thereof.

In testimony whereof, I affix my signature, in presence of two witnesses.

SAMUEL MONTGOMERY.

Witnesses:
J. M. TWITTY,
E. MESSICK.